United States Patent
Xiong et al.

(10) Patent No.: US 10,307,914 B2
(45) Date of Patent: Jun. 4, 2019

(54) ROBOT WITH ROTARY STRUCTURE

(71) Applicant: UBTECH Robotics Corp., Shenzhen (CN)

(72) Inventors: Youjun Xiong, Shenzhen (CN); Wenquan Shu, Shenzhen (CN); Wenhua Yu, Shenzhen (CN); Qi Zhao, Shenzhen (CN); Youpeng Li, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 352 days.

(21) Appl. No.: 15/448,495

(22) Filed: Mar. 2, 2017

(65) Prior Publication Data

US 2018/0186014 A1 Jul. 5, 2018

(30) Foreign Application Priority Data

Dec. 30, 2016 (CN) .......................... 2016 1 1259606

(51) Int. Cl.
*B25J 17/00* (2006.01)

(52) U.S. Cl.
CPC .......... *B25J 17/00* (2013.01); *Y10T 74/20329* (2015.01)

(58) Field of Classification Search
CPC ...... B25J 17/00; B25J 11/0015; B25J 11/003; Y10T 74/20329
See application file for complete search history.

(56) References Cited

U.S. PATENT DOCUMENTS

| | | | | |
|---|---|---|---|---|
| 6,564,669 | B1 * | 5/2003 | Garnier | B25J 3/00 74/490.12 |
| 8,661,928 | B1 * | 3/2014 | Tilden | B25J 17/00 74/490.05 |
| 8,733,196 | B2 * | 5/2014 | Goppelsroder | F16H 57/025 74/421 A |
| 2010/0162846 | A1 * | 7/2010 | Lee | B25J 9/1045 74/490.04 |
| 2011/0067517 | A1 * | 3/2011 | Ihrke | B25J 9/126 74/490.03 |
| 2012/0061155 | A1 * | 3/2012 | Berger | B25J 5/007 180/21 |
| 2014/0137688 | A1 * | 5/2014 | Song | B25J 17/00 74/490.05 |
| 2014/0137689 | A1 * | 5/2014 | Nogami | B25J 18/00 74/490.05 |
| 2017/0217025 | A1 * | 8/2017 | Okada | B25J 17/00 |
| 2017/0307836 | A1 * | 10/2017 | Iwasaki | B25J 19/0029 |
| 2018/0186013 | A1 * | 7/2018 | Xiong | B25J 17/00 |
| 2019/0061161 | A1 * | 2/2019 | Higuchi | A63H 33/005 |

FOREIGN PATENT DOCUMENTS

WO WO-2012160659 A1 * 11/2012 .............. B25J 17/00

* cited by examiner

*Primary Examiner* — Terence Boes (57) ABSTRACT

A robot includes a head, a shoulder, and a rotary structure. The head includes a housing and a fixing frame. Connection assemblies are disposed between the housing anti the fixing frame. Each of the connection assemblies has a fixing shaft fixedly connected to the fixing frame and a flange rotatably installed to the fixing shaft, and the flange is fixedly connected to the housing. The rotary structure includes an adapter rotatably connecting the fixing shaft about an axis of the fixing shaft and a drive source rotating the adapter. The adapter has an installation disc portion for connecting the shoulder and a drive portion for connecting the drive source.

18 Claims, 11 Drawing Sheets

ROBOT WITH ROTARY STRUCTURE

CROSS REFERENCE TO RELATED APPLICATIONS

This application claims priority to Chinese Patent Application No. 201611259606.2, filed Dec. 30, 2016, which is hereby incorporated by reference herein as if set forth in its entirety.

BACKGROUND

1. Technical Field

The present disclosure generally relates to robots, and particularly to a robot with a rotary structure for connecting a head portion and a shoulder portion of the robot.

2. Description of Related Art

At present, robots with general programming capabilities and operational functions are known as it robots, which have a wide range of applications. A traditional intelligent robot mainly includes a head and a trunk. Two sides of the trunk are configured with arms. However, the arm has a complex swing structure, and has poor transmission stability.

SUMMARY

The purpose of the present disclosure is providing a robot with a rotary structure to resolve the drawback that the arm has a complex swing structure and poor transmission stability in the prior art.

According to the present disclosure, a robot is provided. The robot comprises a robot head portion, a shoulder portion, as well as a rotary structure. The robot head portion comprises a housing defining an internal space and a fixing frame disposed in the internal space. At least one set of connection assemblies are disposed between the housing and the fixing frame, wherein each of the connection assemblies comprises a fixing shaft fixedly connected to the fixing frame and a flange rotatable installed to the fixing shaft through a first bearing, and the flange is fixedly connected to the housing. The rotary structure comprises an adapter rotatably connecting the fixing shaft about an axis of the fixing shaft and a drive source rotating the adapter, wherein the adapter comprises an installation disc portion for connecting the shoulder portion, a drive portion for connecting the drive source, and a holding portion connected between the installation disc portion and the drive portion. The fixing shaft defines a first shaft hole for accommodating the drive portion. The drive source is disposed on the fixing frame and supported by the fixing frame. The drive portion and the fixing shaft are disposed coaxially, and a second bearing is disposed between the drive portion and the fixing shaft.

Furthermore, the drive source is a servo assembly with a steering wheel, and the steering wheel is fixedly connected to an outer end surface of the drive portion.

Furthermore, the fixing shaft comprises a shaft portion and a chassis portion connected to one end of the shaft portion for fixedly connected to the fixing frame. The first hearing is put around the shaft portion and is supported by the shaft portion.

Furthermore, the internal space is further disposed with a rotation driving apparatus for rotating the flange, wherein the rotation driving apparatus comprises a power source and a transmission mechanism connected between the power source and the flange. The transmission mechanism comprises a driven wheel fixedly connected with the flange and a driving wheel for driving the driven wheel to rotate, and the driving wheel is connected to the power source.

Furthermore, the driven wheel is rotatably put around the first bearing, and an inner wall of the driven wheel has a limit flange protruding inwardly for restricting the movement of the first bearing.

Furthermore, the transmission mechanism further comprises a transmission belt wound between the driven wheel and the driving wheel, and an outer wall of the driven wheel has an anti-separation flange protruding outwardly for restricting the movement of the transmission belt.

Furthermore, an outer wall of the driven wheel includes a first tooth portion, an outer wall of the driving wheel includes a second tooth portion, and an inner peripheral surface of the transmission belt includes a third tooth portion engaged with both the first tooth portion and the second tooth portion.

Furthermore, the flange comprises at annular flange portion for fixedly connecting to the housing, an assembly portion for fixedly connecting to the limit flange, and a connection portion connected between the flange portion and the assembly portion.

Furthermore, the amount of the shoulder portion is two, and the two shoulder portions are connected to the robot head portion in a bilateral manner. The fixing frame is disposed with two drive sources, and the two drive sources are respectively corresponding to the two shoulder portions.

Furthermore, the housing has a spherical shape and comprises a front case and a rear cover, wherein the front case and the rear cover enclose to form the inner space, and the front case is locked to the rear cover through the flange.

In comparison with the prior art, the present disclosure provides a robot with as shoulder portion which is capable of rotatably connecting to a fixing shaft through an adapter so as to rotate the adapter through an drive source, so that the shoulder portion drives an arm of the robot to swing back and forth with respect to the robot head portion, which has better transmission stability.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

In order that the technical problems, technical solutions and advantageous effects to be solved by the present invention can be more clearly understood, the present invention will be described in more detail with reference to the accompanying drawings and examples. It is to be understood that the described embodiments are a part of embodiments of the present invention, and not all embodiments. Based on the described embodiments of the present invention, all other embodiments obtained by those ordinary skilled in the art without the use of inventive labor are within the scope of the present invention.

In order to enable those skilled in the art to better understand the technical solution of the present invention, the implementation of the present invention will be described in detail below with reference to specific drawings.

The direct or location relationships indicated by the terms "front", "back", "left", "right", "upper", "lower" and the like are based on the orientation or positional relation shown in the drawings, which are merely for the convenience to describe the present disclosure and for simplifying the descriptions, rather than indicating or implying the descripted apparatus or component need to have a particular orientation and constructed/operated in the particular orientation, and therefore can't be comprehended, as the limitations to this disclosure.

Unless otherwise defined, technical terms or scientific terms used herein should be in the ordinary meaning as understood by those ordinary skilled in the art. The terms "the first" and "the second" and the like are merely for the convenience of description, and can't be comprehended as indicating/implying, the order, the amount, or the relative importance of the descripted technical characteristic. Therefore, the characteristics limited by "the first" and "the second" could include one or more of the characteristics expressly or implicitly. Likewise, the terms "a" or "one" and the like do not denote a numerical limitation, but rather denote the presence of at least one.

Figure 1:
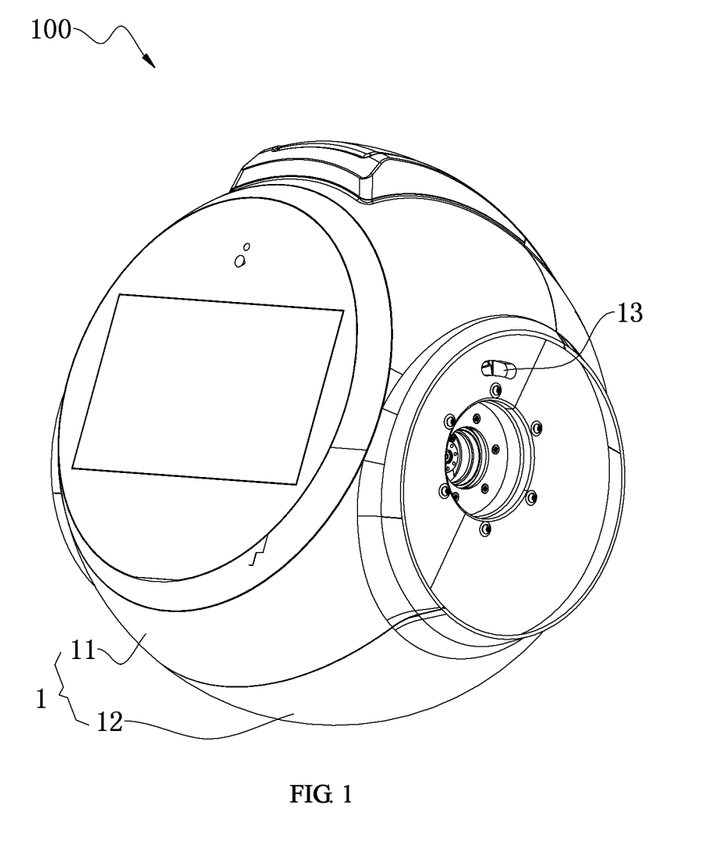
FIG. 1 is a three dimensional view of a head portion of a robot according to an embodiment of the present disclosure.

FIG. 1 shows a preferred embodiment of the present disclosure.

Figure 2:
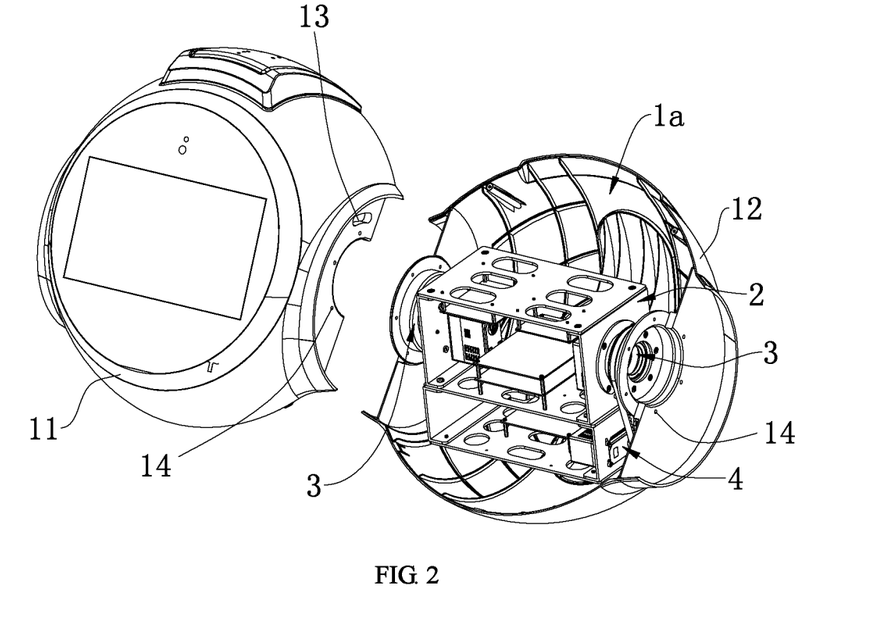
FIG. 2 is an exploded view of a head portion of a robot according to an embodiment of the present disclosure.

Referring to FIG. 1 and FIG. 2, the robot comprises a robot head portion 100, shoulder portions 300 (see FIG. 9 and FIG. 10), as well as a rotary structure. The robot head portion 100 comprises a housing 1 and a fixing frame 2, wherein the housing 1 defines an internal space 1a, and the fixing frame 2 is disposed in the internal space 1a. At least one set of connection assemblies 3 (e.g., two connection assemblies 3) are disposed between the housing 1 and the fixing frame 2, wherein each of the connection assemblies 3 comprises a fixing shaft 31 and a flange 33. The fixing shaft 31 is fixedly connected to the fixing frame 2, the flange 33 is rotatably installed to the shaft 31 through a first bearing 32, and the flange 33 is fixedly connected to the housing 1. The rotary structure comprises an adapter 6 and a drive source 7, wherein the adapter 6 is rotatably connected with the fixing shaft 31 about an axis of the fixing shaft 31, and the drive source 7 enables the adapter 6 to rotate. The adapter 6 comprises an installation disc portion 61, a drive portion 62, and a holding portion 63, wherein the installation disc portion 61 is utilized to connect the shoulder portion 300, the drive portion 62 is utilized to connect with the drive source 7, and the holding portion 63 is connected between the installation disc portion 61 and the drive portion 62. The fixing shaft 31 defines a first shaft hole 31a for accommodating the drive portion 62. The drive source 7 is disposed on the fixing flame 2 and supported by the fixing frame 2. The drive portion 62 and the fixing shaft 31 are disposed coaxially, and a second bearing 8 is disposed between the drive portion 62 and the fixing shaft 31.

The above-mentioned robot has the shoulder portion 300 which is rotatably connected to the fixing shaft 31 through the adapter 6 so as to rotate the adapter 6 through the drive source 7, so that the shoulder portion 300 drives an arm of the robot to swing back and forth with respect to the robot head portion 100, which has better transmission stability.

Figure 9:
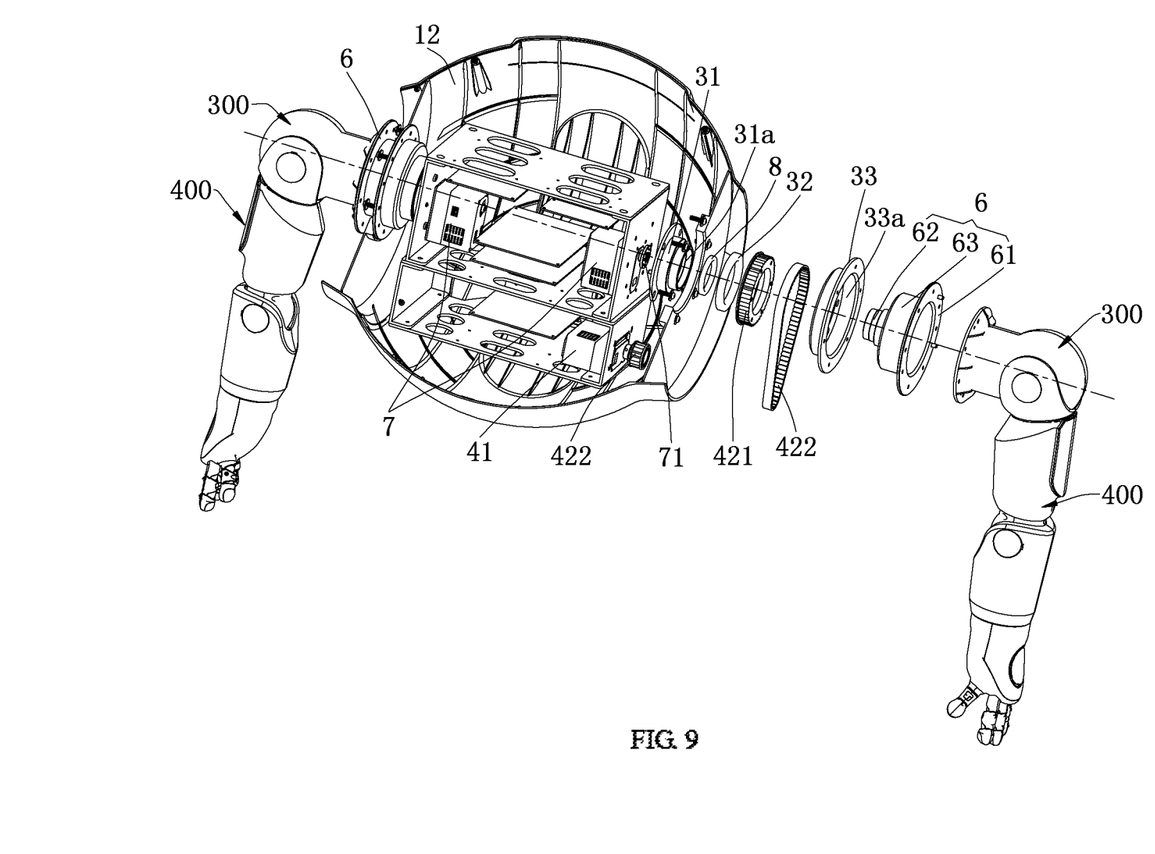
FIG. 9 is an exploded view of a head portion, shoulder portions, and arms of a robot according to an embodiment of the present disclosure.
Figure 10:
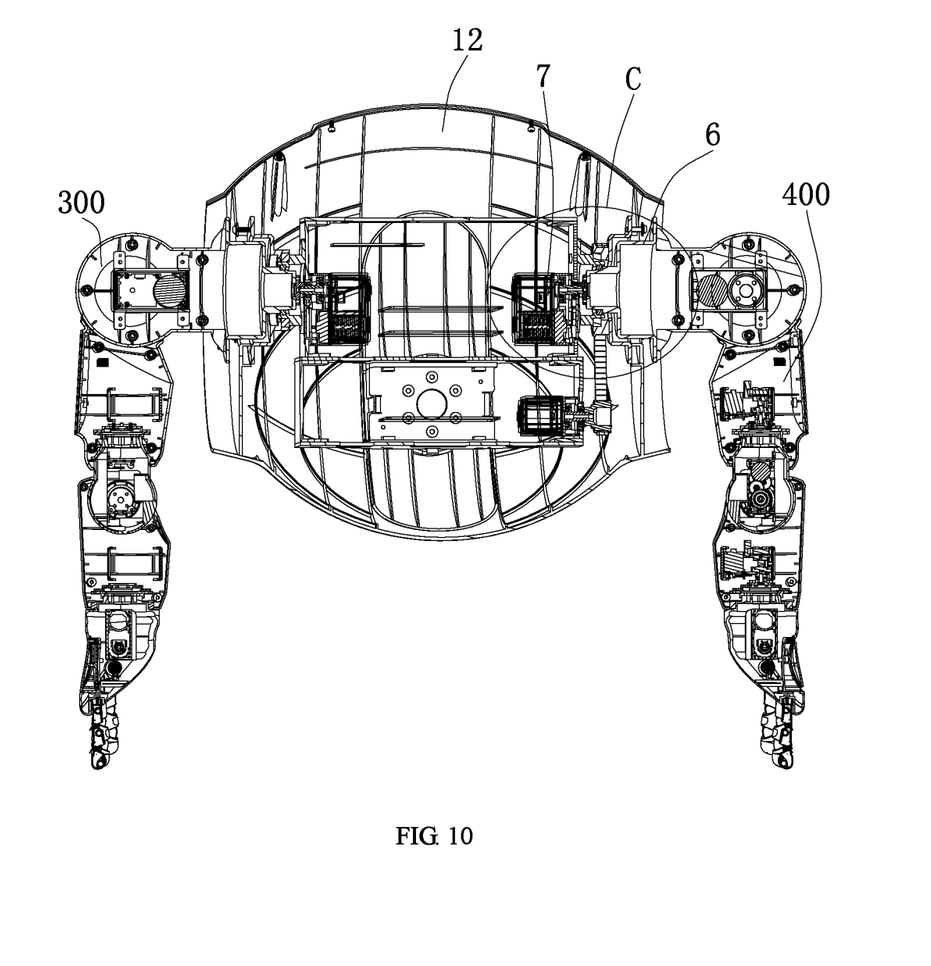
FIG. 10 is a cross-sectional view of a head portion, shoulder portions, and arms of a robot according to an embodiment of the present disclosure.

The robot further comprises arms 400 (see FIG. 9 and FIG. 10). The shoulder portion 300 is connected between the robot head portion 100 and the arm 400.

Referring to FIG. 1 and FIG. 2, the robot head portion 100 comprises the housing 1 with the internal space 1a, the fixing frame 2 disposed in the internal space 1a, the connection assemblies 3, and a rotation driving apparatus 4.

Referring to FIG. 1 and FIG. 2, the housing 1 is substantially spherical in shape. The above-mentioned components are disposed in the housing 1 and protected by the housing 1. In this embodiment, the housing 1 is rotatable relative to the fixing frame 2, and an inner wall of the housing 1 can be fixedly installed with an adaption board, a power supply board, etc. The housing 1 comprises a front case 11 and a back cover 12 which are connected with each other, wherein the front case 11 and the back cover 12 enclose to form the inner space 1a. A front side of the front case 11 has a flat surface, and display screen or a camera could be installed on the flat surface. The front case 11 and the rear cover 12 each comprises a side portion for connecting with the flange 33. A through hole 13 is provided in a side portion of the front case 11.

Figure 3:
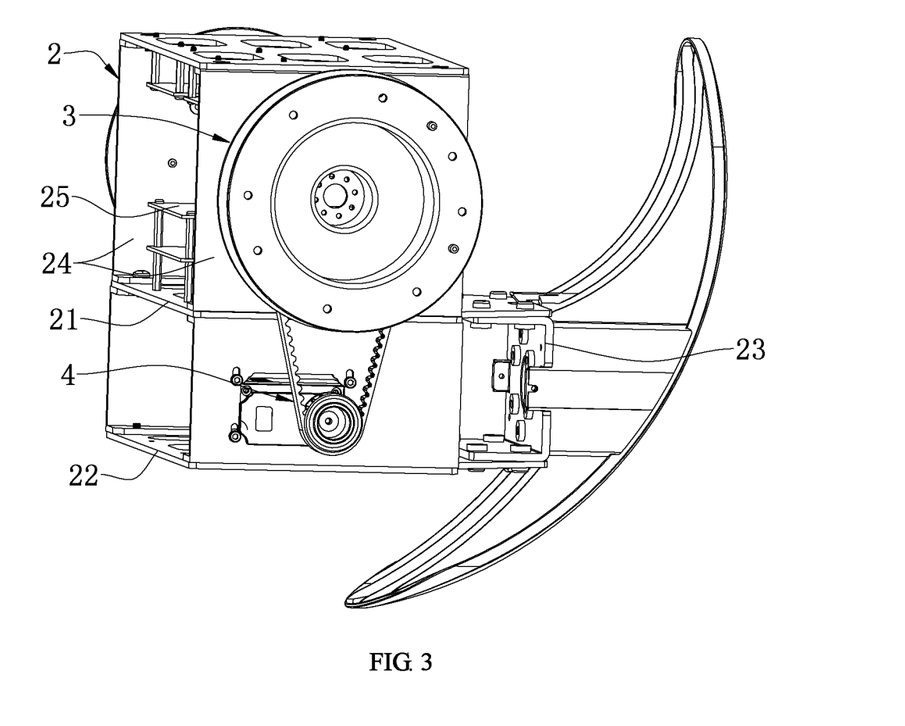
FIG. 3 is a three dimensional view of a fixing frame according to an embodiment of the present disclosure.
Figure 4:
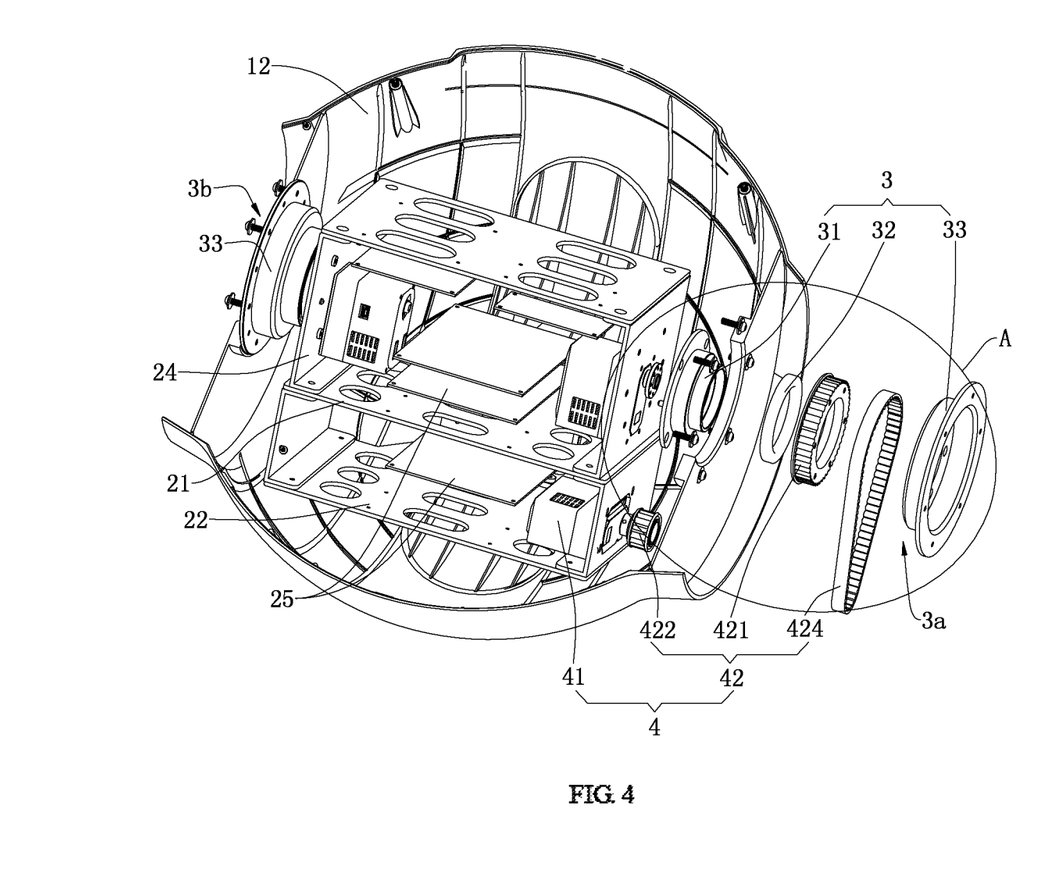
FIG. 4 is an exploded view of a fixing frame, a connection assembly, and a transmission mechanism according to an embodiment of the present disclosure.
Figure 5:
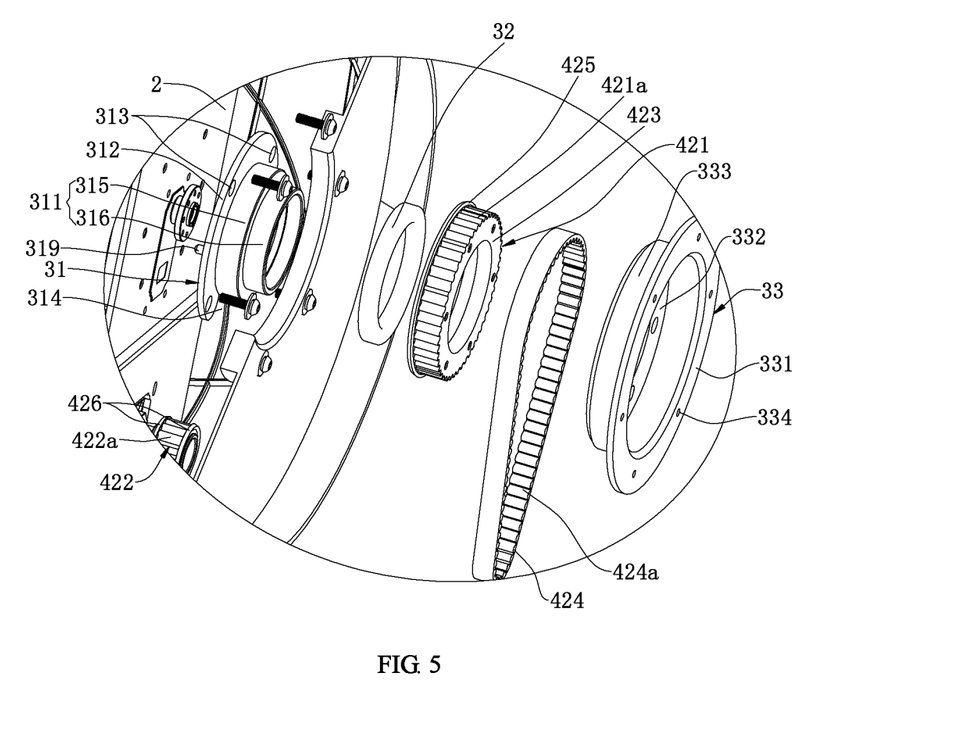
FIG. 5 is an enlarged view of part A of FIG. 4.
Figure 6:
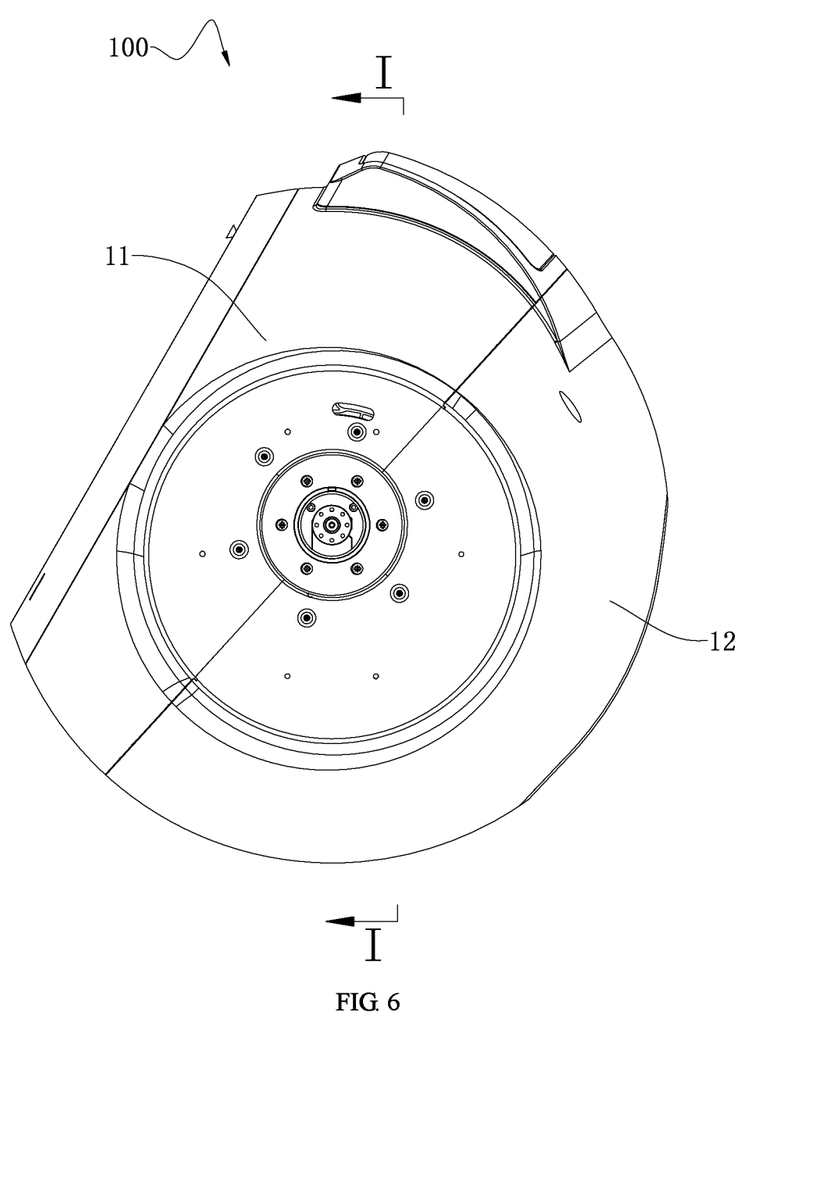
FIG. 6 is a side view of a head portion of a robot according to an embodiment of the present disclosure.
Figure 7:
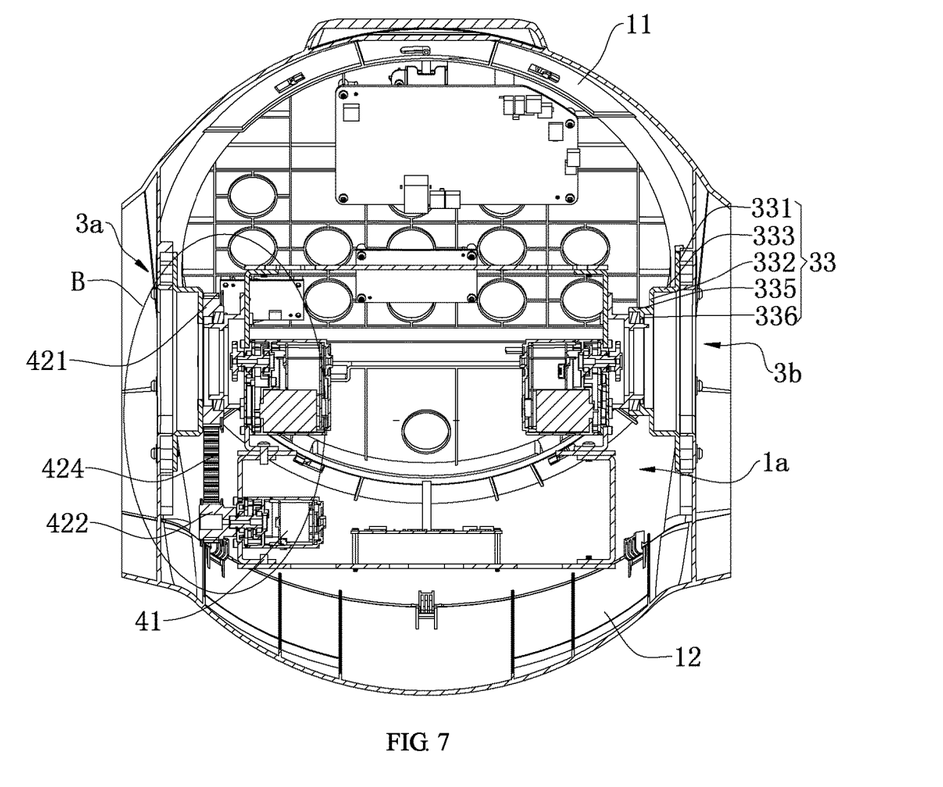
FIG. 7 is a cross-sectional view taken along line I-I of FIG. 6.
Figure 8:
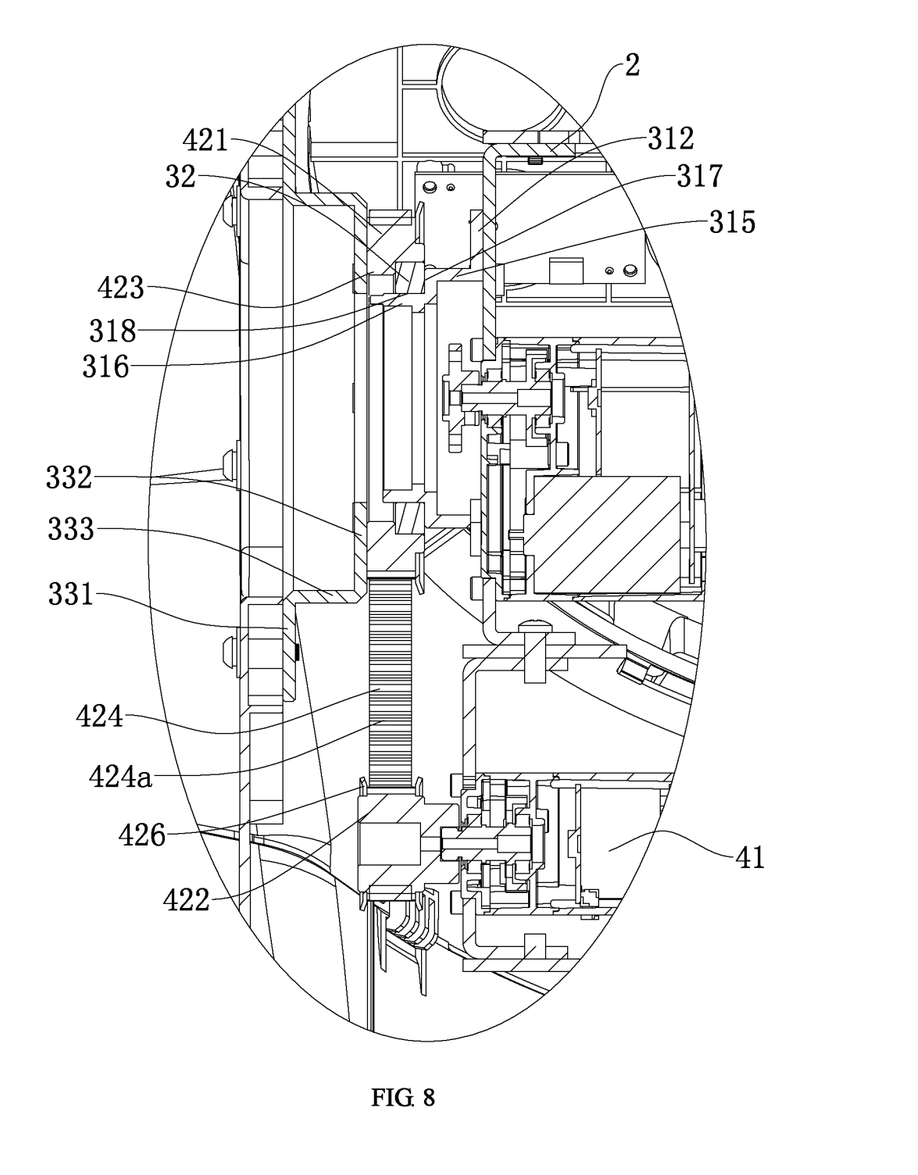
FIG. 8 is an enlarged view of part B of FIG. 7.

Referring to FIGS. 2 to 4, the fixing frame 2, as a rotation supporting structure of the housing 1, is fixedly connected with a support base (not shown) which is in exterior of the housing 1. In this embodiment, the fixing frame 2 is, but not limited to, a square frame with a two-layer structure. The fixing frame 2 comprises an upper plate 21, a lower plate 22 located below the upper plate 21, a locking stand 23, and side plates 24 on two sides of the upper plate 21. The upper plate 21 and the lower plates 22 could be disposed with a supporting plate 25 for placing electrical components. The locking stand 23 is connected between rear sides of the upper plate 21 and the lower plates 22, thereby fixing with the support base.

Referring to FIGS. 2 to 4, the connection assembly 3 is utilized to connect the fixing frame 2 and the housing 1. The connection assembly 3 comprises a fixing shaft 31, a first hearing 32, and a flange 33. The fixing shaft 31 is fixedly connected to the side plates 24 of the fixing frame 2. The first hearing 32 could be a rolling bearing, and is installed on the fixing shaft 31. The flange 33 is put around the first bearing 32, and is fixedly connected to the housing 1. The housing 1 rotates with respect to the fixing frame 2 through the rotation of the flange 33 on the fixing shaft 31. In this embodiment, the amount of the connection assembly 3 is, but not limited to, two sets. The two sets of the connection assemblies 3 are disposed in a bilateral manner about a central line of the fixing frame 2 which is perpendicular to the upper plate 21 and the lower plates 22, and the first hearings 32 on the left and right sides are disposed coaxially. As a result, since the left and right sides of the fixing frame 2 are pivoted to the housing 1, the housing 1 rotates more smoothly with respect to the fixed frame 2, and the rotary structure could be more firm.

For the convenience of description, the two connection assemblies are named as a first connection assembly 3a and a second connection assembly 3b, respectively. The first connection assembly 3a and the second connection assembly 3b are disposed on two sides of the fixing frame 2 in a bilateral manner, and are disposed coaxially. The structure of the first connection assembly 3a and the second connection assembly 3b could be the same or similar. The following will take the first connection assembly 3a as an example for briefly describing the structure of the first connection assembly 3a and the second connection assembly 3b.

Referring to FIGS. 4 to 8, the fixing shaft 31 of the first connection assembly 3a has a hollow structure. The fixing shaft 31 comprises a shaft portion 311 and a chassis portion 312, wherein the shaft portion 311 extends horizontally and is in a cylindrical shape, and the chassis portion 312 is connected to a side of the shaft portion 311. In this embodiment, the fixing shaft 31 defines a first shaft hole 31a, the shaft portion 311 and the chassis portion 312 are monolithic, and a plurality of assembly holes 313 are formed on the chassis portion 312 along a circumferential direction of the chassis portion 312 with intervals between two adjacent assembly boles 313. Screw holes corresponding to the assembly holes 313 are formed on the side plates 24. A screw could sequentially passed through the assembly hole 313 and the screw hole, thereby fixing the fixing shaft 31 to an outside of the fixing frame 2. The chassis portion 312 has a positioning notch 314, and has positioning post(s) 319 protruding therefrom, which facilitates the connection between the fixing shaft 31 and the fixing frame 2. Particularly, the shaft portion 311 comprises a sleeve portion 315 and a support portion 316, wherein the sleeve portion 315 protrudes from a side surface of the chassis portion 312 which is away from the fixing frame 2, and the annular support portion 316 extends outwardly from the outer end face of the sleeve portion 315 along the axis of the sleeve portion 315. The outer end surface of the sleeve portion 15 has a first support surface 317 surrounding the outer side of the support portion 316, and the outer circumferential surface of the support portion 316 has a second support surface 318. The first bearing 32 could be put around the support portion 316 by tightly matching, and the second support surface 318 abuts against (in contact with) an inner peripheral surface of the first bearing 32 while the first support surface 317 abuts against (in contact with) a side end surface of the first bearing 32 which is close to the fixing frame 2, thereby restraining the movement of the first bean 32 toward the chassis portion 312.

Referring to FIGS. 4 to 8, the flange 33 of the first connection assembly 3a comprises a flange portion 331 for fixedly connected with the housing 1, an assembly portion 332, and a connection portion 333 connected between the flange portion 331 and the assembly portion 332. In this embodiment, the flange 33 defines a second shaft bole 33a. The flange portion 331, the assembly portion 332, and the connection portion 333 are monolithic. The flange portion 331 is substantially in a disc shape. The connection portion 333 extends from the inner edge of the flange portion 331 along the axial direction of the flange portion 331. The assembly portion 332 extends from the inner edge of one end of the connection portion 333 which is away from the flange portion 331 along the radial direction of the connection portion 333. A plurality of locking holes 334 are formed on the flange portion 331 along a circumferential direction of the flange portion 331 with intervals between two adjacent locking holes 334. A side portion of the front case 11 and a side portion of the rear cover 12 are each provided with lock holes 14 corresponding to the locking holes 334. After screws pass through the lock hole 14 of the front case 11 and the corresponding locking holes 334 as well as the lock hole 14 of the rear cover 12 and the corresponding locking holes 334, the front case 11 and the rear cover 12 could be fixed to an outside of the flange 33, and the front case 11 and the rear cover 12 are fixedly connected.

Referring to FIGS. 4 to 8, the rotation driving apparatus 4 is utilized to enable the flange 33 of the first connection assembly 3a to rotate, thereby driving the housing 1 to rotate with respect to the fixing frame 2. In this embodiment the amount of the rotation driving apparatus 4 is, but not limited to, one. The rotation driving apparatus 4 comprises a power source 41 and a transmission mechanism 42 connected between the power source 41 and the flange 33. The power source 41 could be, but is not limited to, a servo, and the transmission mechanism 42, comprises a driven wheel 421 fixedly connected to the flange 33 and a driving wheel 422 for driving the driven wheel 421 to rotate. The driving wheel 422 is connected to an output shaft of the power source 41, and is coaxially disposed with the output shaft, thereby driving the driving wheel 422 to rotate through the output shaft when the power source 41 operates. The housing 1 could rotate with respect to the fixing frame 2 through rotating the rotation driving apparatus 4, which enables the robot head portion 100 to swing back and forth so as to realize the forward and backward motion of the robot bead portion 100.

Of course, the output shall of the power source 41 could also be provided with a steering wheel, and the driving wheel 422 could be installed on the steering wheel, so that the power source 41 could drive the steering wheel to rotate the driving wheel 422.

Particularly, referring to FIGS. 4 to 8, a side end face of the driven wheel 421 is locked and fixed by screws with the assembly portion 332 of the flange 33 in the first connection assembly 3a, the driven wheel 421 is rotatably put around the first bearing 32, and an inner wall (i.e., inner peripheral surface) of the driven wheel 421 has a limit flange 423 protruding inwardly for restricting the movement of the first bearing 32. It is to be noted that, after the driven wheel 421 is put around the shaft portion 311 of the fixing shaft 31, the inner wall of the driven wheel 421 abuts against in contact with) an outer peripheral surface of the first bearing 32 in the first connection assembly 3a, an outer end surface (a side end surface close to the fixing frame 2) of the limit flange 423 abuts against (in contact with) the side end surface of the first bearing 32 which is away from the fixing frame 2. The driven wheel 421 and the shaft portion 311 jointly define a limitation space for accommodating the first bearing 32, and the outer end surfaces of the first support surface 317 the second support surface 318, and the limit flange 423 are positioned in the limitation space to lock the position of the first bearing 32. As a result, when the housing 1 rotates, the first bearing 32 does not move, and the housing 1, and the housing 1 as well as the fixing frame 2 do not move with respect to each other, hence has better rotational stability.

It should be noted that, in this embodiment, since only one rotation driving apparatus 4 is used, the rotation driving apparatus 4 is connected to the first connection assembly 3a, and the second connection assembly 3b disposed on the other side of the fixing frame 2 is not connected to the rotation driving apparatus 4, hence the main difference between the first connection assembly 3a and the second connection assembly 3b consists in the structure of the flange 33. The flange 33 of the first connection assembly 3a is assembled to the first bearing 32 of the first connection assembly 3a through the driven wheel 421. As can be seen from FIG. 7, the flange 33 of the second connection assembly 3b is directly assembled to the first bearing 32 of the second connection assembly 3b, and the second connection assembly 3b comprises a flange portion 331 for fixedly connecting with the housing 1, an assembly portion 332, a connection portion 333 connected between the flange portion 331 and the assembly portion 332, an extending portion 335 extending in the axial direction of the flange portion 331 from the assembly portion 332, and a protrusion portion 336 protruding on an inner wall of the extending portion 335. After the flange 33 is put around the shaft portion 311 of the fixing shaft 31, an inner wall of the extending portion 335 abuts against (in contact with) the outer peripheral surface of the first bearing 32, and an outer end surface to side end surface close to the fixing frame 2) of the protrusion portion 336 abuts against (in contact with) the side end surface of the first bearing 32 which is away from the fixing frame 2.

Of course, when two rotation driving apparatus 4 are used, both the first connection assembly 3a and the second connection assembly 3b are connected to the corresponding rotation driving apparatus 4, and the first connection assembly 3a and the second connection assembly 3b have the same structure.

Referring to FIGS. 4 to 8, in this embodiment, the transmission mechanism 42 is a pulley transmission mechanism, wherein the driven wheel 421 and the driving wheel 422 are both pulleys, and the transmission mechanism 42 further comprises a transmission belt 424 wound between the driven wheel 421 and the driving wheel 422. An outer wall (i.e., inner peripheral surface) of the driven wheel 421 has an anti-separation flange 325 protruding outwardly for restricting the movement of the transmission belt 424. An upper end portion of the transmission belt 424 is clamped between the anti-separation flange 425 and the assembly portion 332 to prevent the transmission belt 424 from separating from the driven wheel 421. It should be noted that, the driving wheel 422 also has an anti-separation structure for restricting the movement of the transmission belt 424, wherein the anti-separation structure are two anti-movement flanges 426 formed on an outer wall (i.e., outer peripheral surface) of the driving wheel 422. The two anti-movement flanges 426 are spaced from each other on the axis of the driving wheel 422. A lower end portion of the transmission belt 424 is clamped between the two anti-movement flanges 426 to prevent the transmission belt 424 from separating from the driving wheel 422.

Of course, the transmission mechanism 42 could also be a gear transmission mechanism in which the driven wheel 421 and the driving wheel 422 are both gears, wherein the driven wheel 421 and the driving wheel 422 could engage with each other, or a gear set for transmission could be disposed between the driven wheel 421 and the driving wheel 422, so as to enable the driven wheel 421 to rotate.

Referring, to FIGS. 4 to 8, an outer wall of the driven wheel 421 includes a first tooth portion 421a, an outer wall of the driving wheel 422 includes a second tooth portion 422a, wherein the transmission belt 424 is single-sided tooth belt with at inner peripheral surface being a rubber contact surface. An inner peripheral surface of the transmission belt 424 includes a third tooth portion 424a engaged with the first tooth portion 421a and the second tooth portion 422a, respectively. As a result, the belt 424 can be prevented from slipping, and the housing 1 could be easily controlled to flip back and forth.

Referring to FIG. 9, the robot is provided with the two shoulder portions 300, wherein the two shoulder portions 300 are connected to the robot head portion 100 in a bilateral manner. The fixing frame 2 is disposed with drive sources 7, wherein the drive source 7 having a shaft (not shown) is for rotating the shoulder portion 300. The axis of the shaft coincides with the axis of the fixing shaft 31. The amount of the drive sources 7 is, but not limited to, two, wherein the two drive sources 7 correspond to the two shoulder portions 300, respectively. The drive source 7 could be a servo with a steering wheel 71, wherein the steering wheel 71 is disposed coaxially with the shaft, and is fixedly connected to the servo through the shaft.

Figure 11:
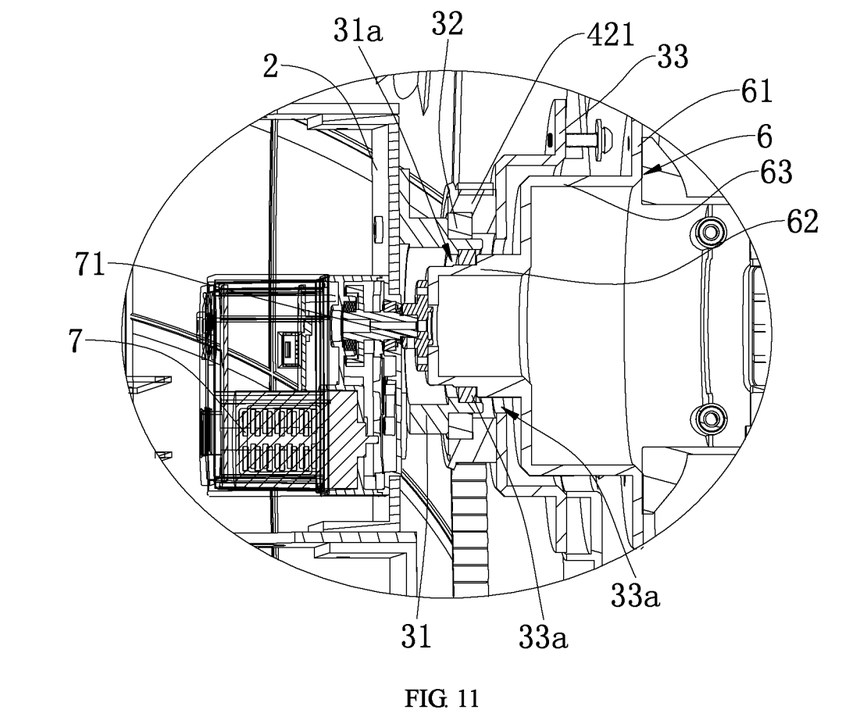
FIG. 11 is an enlarged view of part C of FIG. 10.

Referring to FIGS. 9 to 11, the adapter 6 is rotatably connected to the fixing shaft 31 about an axis of the fixing shaft 31. The adapter 6 comprises an installation disc portion 61, a drive portion 62, and a holding portion 63, wherein the installation disc portion 61 is utilized to connect the shoulder portion 300, the drive portion 62 is utilized to connect the shaft of the drive source 7, and the holding portion 63 is connected between the installation disc portion 61 and the drive portion 62. In this embodiment, the amount of the adapter 6 is, but not limited to, two. The two adapters 6 are connected to the right and the left shoulder portions 300, respectively. The adapter 6 could have a hollow structure to facilitate the routing of power supply lines. The holding portion 63 has a cylindrical shape, which extends axially from a side of the installation disc portion 61. An outer diameter of the holding portion 63 is smaller than an outer diameter of the installation disc portion 61. The drive portion 62 has a cylindrical shape, which extends axially from an end of the holding portion 63. An outer diameter of the drive portion 62 is smaller than an outer diameter of the holding portion 63. The drive portion 62 passes through the second shaft hole 33a, and is accommodated in first shaft hole 31a. The steering wheel 71 is fixedly connected to an outer end surface of the drive portion 62. The drive portion 62 is disposed coaxially with the fixing shaft 31. A second bearing 8 is disposed between an outer periphery of the drive portion 62 and an inner edge of the fixing shaft 31, wherein the second bearing 8 could be a rolling bearing. It is worth noting that, the two drive sources 7 could operate simultaneously or not simultaneously, and the two shoulder portions 300 could rotate independently. Through the drive source 7, the adapter 6 could rotate about the axis of the fixing shaft 31, which realizes the back-and-forth swing of the arms of the robot.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. A robot, comprising:
 a robot head portion, wherein the robot head portion comprises a housing defining an internal space and a fixing frame disposed in the internal space, and at least one set of connection assemblies are disposed between the housing and the fixing frame; wherein each of the connection assemblies comprises a fixing shaft fixedly connected to the fixing frame and a flange rotatably installed to the fixing shaft, and the flange is fixedly connected to the housing;

a shoulder portion; and a rotary structure, wherein the rotary structure comprises an adapter rotatably connecting the fixing shaft about an axis of the fixing shaft and a drive source rotating the adapter, wherein the adapter comprises an installation disc portion for connecting the shoulder portion, a drive portion for connecting the drive source, and a holding portion connected between the installation disc portion and the drive portion;

wherein, the fixing shaft defines a first shaft hole for accommodating the drive portion, the drive source is disposed on the fixing frame and supported by the fixing frame, the drive portion and the fixing shaft are disposed coaxially.

2. The robot of claim 1, wherein the drive source is a servo assembly with a steering wheel, and the steering wheel is fixedly connected to an outer end surface of the drive portion.

3. The robot of claim 1, wherein the flange is rotatably installed to the fixing shaft through a first bearing.

4. The robot of claim 3, wherein the fixing shaft comprises a shaft portion and a chassis portion connected to one end of the shaft portion for fixedly connected to the fixing frame; wherein the first bearing is put around the shaft portion and is supported by the shaft portion.

5. The robot of claim 1, wherein the internal space is further disposed with a rotation driving apparatus for rotating the flange; wherein the rotation driving apparatus comprises a power source and a transmission mechanism connected between the power source and the flange; wherein the transmission mechanism comprises a driven wheel fixedly connected with the flange and a driving wheel for driving the driven wheel to rotate, and the driving wheel is connected to the power source.

6. The robot of claim 2, wherein the internal space is further disposed with a rotation driving apparatus for rotating the flange; wherein the rotation driving apparatus comprises a power source and a transmission mechanism connected between the power source and the flange; wherein the transmission mechanism comprises a driven wheel fixedly connected with the flange and a driving wheel for driving the driven wheel to rotate, and the driving wheel is connected to the power source.

7. The robot of claim 4, wherein the internal space is further disposed with a rotation driving apparatus for rotating the flange; wherein the rotation driving apparatus comprises a power source and a transmission mechanism connected between the power source and the flange; wherein the transmission mechanism comprises a driven wheel fixedly connected with the flange and a driving wheel for driving the driven wheel to rotate, and the driving wheel is connected to the power source.

8. The robot of claim 5, wherein the flange is rotatably installed to the fixing shaft through a first bearing, the driven wheel is rotatably put around the first bearing, and an inner wall of the driven wheel has a limit flange protruding inwardly for restricting the movement of the first bearing.

9. The robot of claim 5, wherein the transmission mechanism further comprises a transmission belt wound between the driven wheel and the driving wheel, and an outer wall of the driven wheel has an anti-separation flange protruding outwardly for restricting the movement of the transmission belt.

10. The robot of claim 7, wherein an outer wall of the driven wheel includes a first tooth portion, an outer wall of the driving wheel includes a second tooth portion, and an inner peripheral surface of the transmission belt includes a third tooth portion engaged with both the first tooth portion and the second tooth portion.

11. The robot of claim 6, wherein the flange comprises an annular flange portion for fixedly connecting to the housing, an assembly portion for fixedly connecting to a limit flange, and a connection portion connected between the flange portion and the assembly portion.

12. The robot of claim 1, wherein the amount of the shoulder portion is two, and the two shoulder portions are connected to the robot head portion in a bilateral manner, wherein the fixing frame is disposed with two drive sources, and the two drive sources are respectively corresponding to the two shoulder portions.

13. The robot of claim 2, wherein the amount of the shoulder portion is two, and the two shoulder portions are connected to the robot head portion in a bilateral manner; wherein the fixing frame is disposed with two drive sources, and the two drive sources are respectively corresponding to the two shoulder portions.

14. The robot of claim 4, wherein the amount of the shoulder portion is two, and the two shoulder portions are connected to the robot head portion in a bilateral manner, wherein the fixing frame is disposed with two drive sources, and the two drive sources are respectively corresponding to the two shoulder portions.

15. The robot of claim 1, wherein the housing has a spherical shape and comprises a front case and a rear cover, the front case and the rear cover enclose to form the inner space, and the front case is locked to the rear cover through the flange.

16. The robot of claim 2, wherein the housing has a spherical shape and comprises a front case and a rear cover, the front case and the rear cover enclose to form the inner space, and the front case is locked to the rear cover through the flange.

17. The robot of claim 4, wherein the housing has a spherical shape and comprises a front case and a rear cover, the front case and the rear cover enclose to form the inner space, and the front case is locked to the rear cover through the flange.

18. The robot of claim 1, wherein a second bearing is disposed between the drive portion and the fixing shaft.

* * * * *